US008550887B2

(12) United States Patent
Walters

(10) Patent No.: US 8,550,887 B2
(45) Date of Patent: Oct. 8, 2013

(54) VEHICLE GRILL WITH MOVEABLE LOUVERS

(75) Inventor: David Walters, Caledonia, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 463 days.

(21) Appl. No.: 12/884,290

(22) Filed: Sep. 17, 2010

(65) Prior Publication Data

US 2011/0070817 A1    Mar. 24, 2011

Related U.S. Application Data

(60) Provisional application No. 61/243,711, filed on Sep. 18, 2009, provisional application No. 61/250,702, filed on Oct. 12, 2009.

(51) Int. Cl.
*B60H 1/34* (2006.01)

(52) U.S. Cl.
USPC .......................................................... 454/155

(58) Field of Classification Search
USPC .......... 454/155, 320, 351, 152, 154, 284, 143
See application file for complete search history.

(56) References Cited

U.S. PATENT DOCUMENTS

| 1,257,218 | A | | 2/1918 | Griswold | |
|---|---|---|---|---|---|
| 1,943,239 | A | | 1/1934 | Johannsen | |
| 2,200,733 | A | * | 5/1940 | Agerell et al. | 165/98 |
| 2,245,931 | A | * | 6/1941 | Meyer | 454/330 |
| 2,248,544 | A | | 7/1941 | Maruhn | |
| 2,357,137 | A | * | 8/1944 | Schneider | 49/86.1 |
| 2,551,921 | A | * | 5/1951 | Arsem | 123/41.04 |
| 4,410,032 | A | | 10/1983 | Mori | |
| 4,457,558 | A | | 7/1984 | Ishikawa | |
| 4,527,355 | A | * | 7/1985 | Numakami et al. | 49/82.1 |
| 4,534,506 | A | | 8/1985 | Ishida et al. | |
| 4,753,288 | A | | 6/1988 | Harvey | |
| 4,779,577 | A | | 10/1988 | Ritter et al. | |
| 5,139,459 | A | * | 8/1992 | Takahashi et al. | 454/187 |
| 5,267,895 | A | * | 12/1993 | Mitchell et al. | 454/57 |
| 6,145,251 | A | * | 11/2000 | Ricci | 49/82.1 |
| 6,439,991 | B1 | * | 8/2002 | Jarnot | 454/118 |
| 6,497,230 | B1 | * | 12/2002 | Higgins et al. | 126/285 R |
| 6,527,333 | B2 | | 3/2003 | Hewitt et al. | |
| 6,918,456 | B2 | | 7/2005 | Dennison et al. | |
| 7,066,245 | B2 | * | 6/2006 | Ebara et al. | 165/202 |
| 7,275,388 | B2 | * | 10/2007 | Joo et al. | 62/408 |

(Continued)

FOREIGN PATENT DOCUMENTS

DE          19715352 B4  *  7/2007

*Primary Examiner* — Kang Hu
*Assistant Examiner* — Anthony Kandare
(74) *Attorney, Agent, or Firm* — Dickinson Wright PLLC

(57) ABSTRACT

A grill for attachment to a front portion of a vehicle including a base frame structure with a mesh front structure secured thereto. The grill has at least one picture frame structure that is moveable with respect to the base frame structure. The grill also includes a plurality of louvers that are in communication with and moveable with respect to each of the base frame structure and the at least one picture frame structure. A motor unit is associated with the grill and is in communication with the at least one picture frame structure to effectuate movement thereof such that as the at least one picture frame structure moves, the plurality of louvers between an open position and a closed position, whereby openings between adjacent ones of the plurality of louvers are exposed or shut off.

17 Claims, 11 Drawing Sheets

(56) References Cited

U.S. PATENT DOCUMENTS

| | | | |
|---|---|---|---|
| 7,384,331 B2 * | 6/2008 | Coulton | 454/365 |
| 7,498,926 B2 | 3/2009 | Browne et al. | |
| 8,181,727 B2 * | 5/2012 | Ritz et al. | 180/68.1 |
| 2004/0171342 A1 * | 9/2004 | Kodaveridan et al. | 454/76 |
| 2006/0102399 A1 * | 5/2006 | Guilfoyle et al. | 180/68.1 |
| 2007/0169725 A1 * | 7/2007 | Harich et al. | 123/41.05 |
| 2009/0050385 A1 | 2/2009 | Guilfoyle et al. | |
| 2010/0071977 A1 * | 3/2010 | Ritz et al. | 180/68.1 |
| 2010/0243351 A1 * | 9/2010 | Sakai | 180/68.1 |
| 2011/0005851 A1 * | 1/2011 | Doroghazi et al. | 180/68.1 |

* cited by examiner

VEHICLE GRILL WITH MOVEABLE LOUVERS

CROSS-REFERENCE TO RELATED APPLICATIONS

The present invention claims priority to U.S. Provisional Patent Application Ser. No. 61/243,711, filed on Sep. 18, 2009 and entitled "Louvered Grill", and U.S. Provisional Application Ser. No. 61/250,702, filed on Oct. 12, 2009 and entitled "Louvered Grill" which application are hereby incorporated by reference.

TECHNICAL FIELD

The present invention relates generally to a grill for a vehicle. More particularly, the present invention relates to a grill for a vehicle that includes movable louvers to selectively vary the flow of air through the grill as desired.

BACKGROUND OF THE INVENTION

Vehicles, such as trucks, tractors for semi trucks or passenger cars, are often provided with a bumper having a central opening or other opening that permits air to flow into lower regions of an engine compartment for cooling purposes. These vehicles typically have a grill positioned over the large central opening at the front of the vehicle. The grill includes a plurality of slats or other static structures that are spaced apart from one another to yield grill openings that allow the admission of air through the grill, into the front opening, and into the vehicle engine compartment to provide engine cooling.

These grill openings, although desirable for admitting air for engine cooling and other purposes such as HVAC, also add to the drag of the vehicle. That is, air enters the grill openings rather than being deflected along the aerodynamically contoured surfaces of the vehicle. This increased drag results in fuel usage inefficiencies (e.g., increased fuel consumption). As efforts to increase fuel economy have increased, some systems have been developed that provide for adjustment of the exterior vehicle grill to control air flow under varying conditions (see U.S. Pat. No. 7,498,926).

While these systems provide increased fuel economy, they still suffer some disadvantages. Accordingly, it is desirable to provide a vehicle grill that improves over these systems in both function and aesthetics.

SUMMARY OF THE INVENTION

Accordingly, it is an advantage of the present invention to provide a vehicle grill that can selectively close or partially close associated grill openings depending upon engine and/or vehicle operating conditions to reduce the drag when less air flow is required to the engine.

It is also another advantage of the present invention to provide a vehicle grill where the grill openings are either partially or entirely closed depending upon such operating conditions to provide increased fuel efficiency.

It is a further advantage of the present invention to provide a vehicle grill that includes a protective structure that prevents objects from passing through the grill openings when they are partially open or fully open and thus prevents damage to the engine compartment.

It is still another advantage of the present invention to provide a vehicle grill that not only enhances function of a vehicle to which the grill is attached, but also enhances the aesthetics of the vehicle.

It is yet another advantage of the present invention to provide a vehicle grill that can be selectively closed to allow for faster engine warm up and reduce the carbon footprint of the vehicle.

In accordance with the above and the other advantages of the present invention, a grill for a vehicle is provided. The grill is secured to a front portion of the vehicle and covers a central opening in the front portion of the vehicle that communicates with an engine compartment. The grill includes a plurality of louvers that are spaced apart to yield openings between adjacent ones of the plurality of louvers. The plurality of louvers are moveable between an open position and a closed position to allow air to pass through the grill openings or close off the grill openings as desired. In the open position, the louvers permit air to pass therebetween and through the central opening into the engine compartment. The louvers are also selectively moveable from the open position to a partially closed or fully closed position such that air flow through the louvers and into the engine compartment is restricted or shut off depending upon the degree of closing of the louvers. The grill also includes a front mesh structure that is located forwardly of the louvers. The louvers and the mesh front structure together form an integral unit such that when the louvers are in the closed position, the slats engage the mesh front structure.

These and other features and advantages of this invention will become more apparent to those skilled in the art from the detailed description of a preferred embodiment. The drawings that accompany the detailed description are described below.

DETAILED DESCRIPTION OF THE PREFERRED EMBODIMENT

Figure 1:
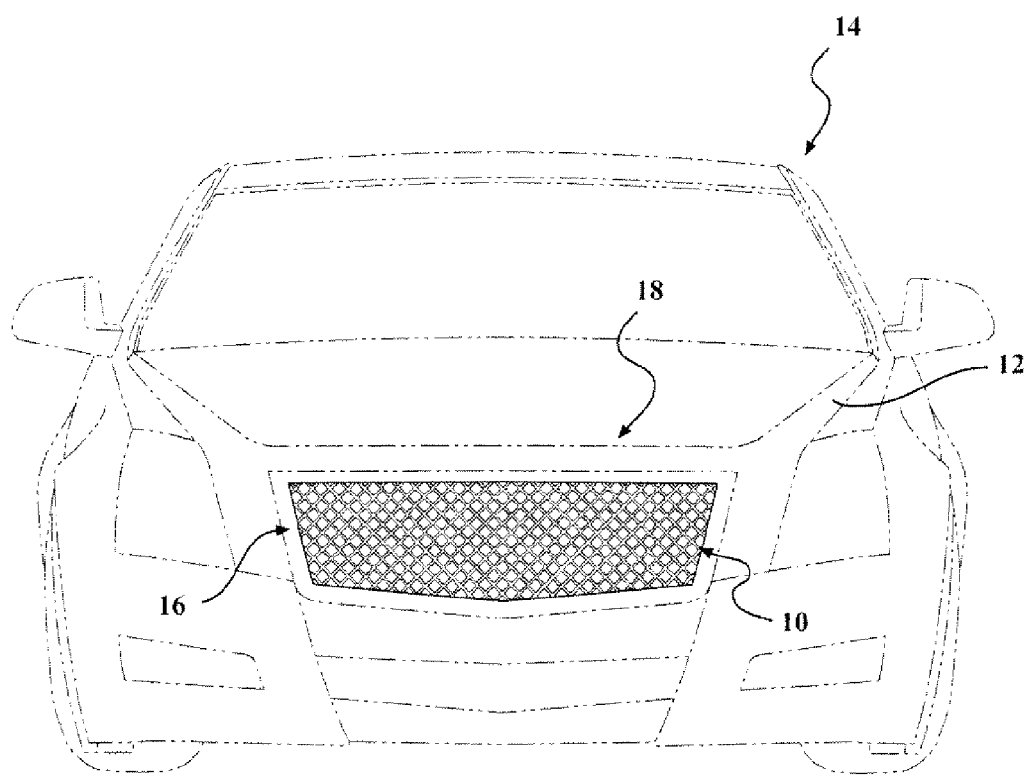
FIG. 1 is a schematic illustration of a vehicle grill attached to a vehicle in accordance with a preferred embodiment of the present invention.

In accordance with the present invention, a vehicle grill for an automotive vehicle is provided. As shown in FIG. 1, the grill 10 is preferably attached to a front portion 12 of the vehicle 14. The vehicle 14 preferably includes a central passageway 16 formed in the front portion 12 that extends between the exterior of the vehicle 14 and an engine compartment 18. The grill 10 is preferably formed from a plastic material. Alternatively, the grill 10 can be formed of a metal, a composite material or any other suitable material. The grill 10 of the present invention is preferably intended for attachment to any suitable vehicle where air flows into the engine compartment, including for cooling purposes, such as a car, a truck, or heavy equipment.

Figure 2:
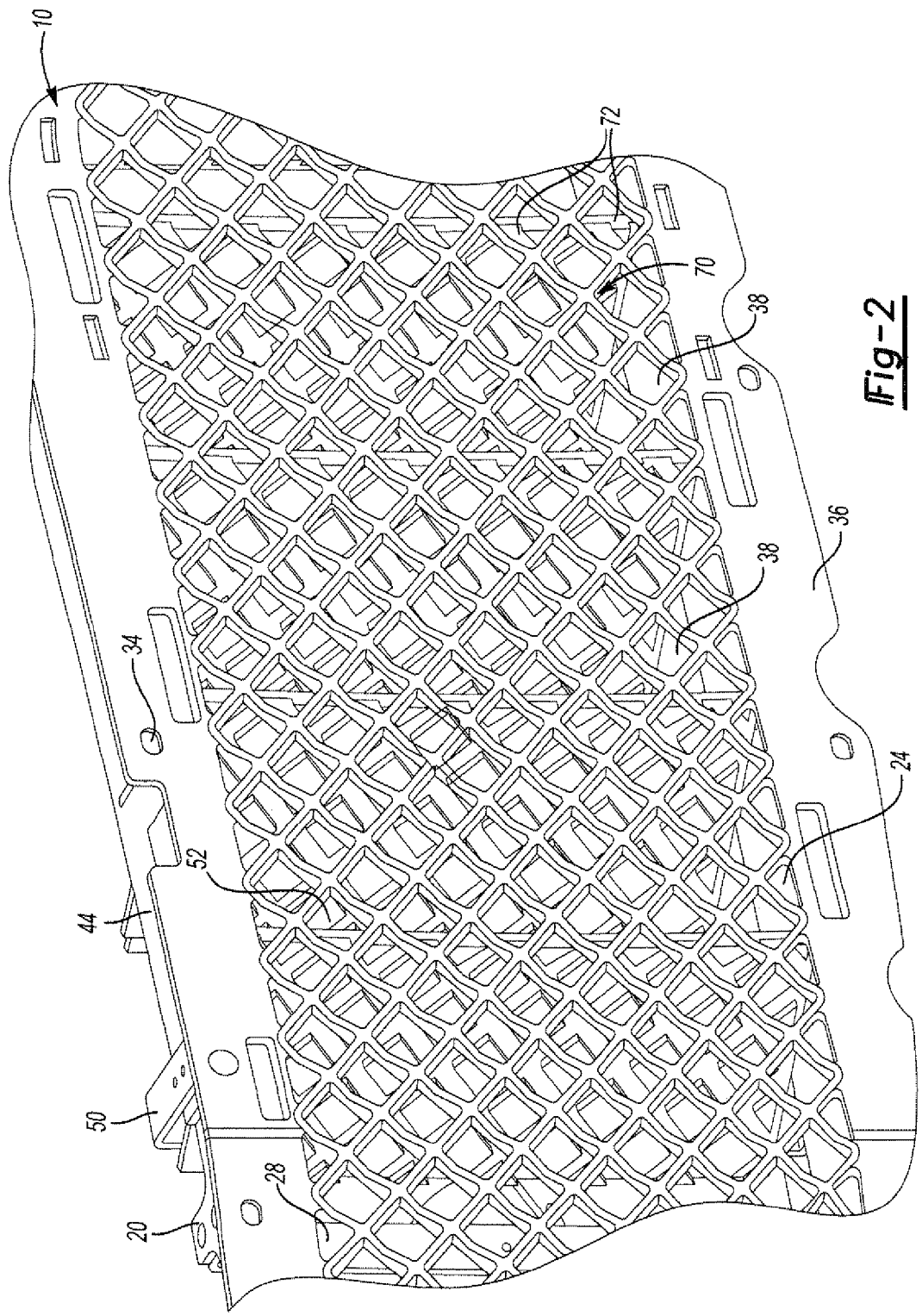
FIG. 2 is a front perspective view of a section of a vehicle grill with the louvers in an open position in accordance with a preferred embodiment of the present invention.
Figure 3:
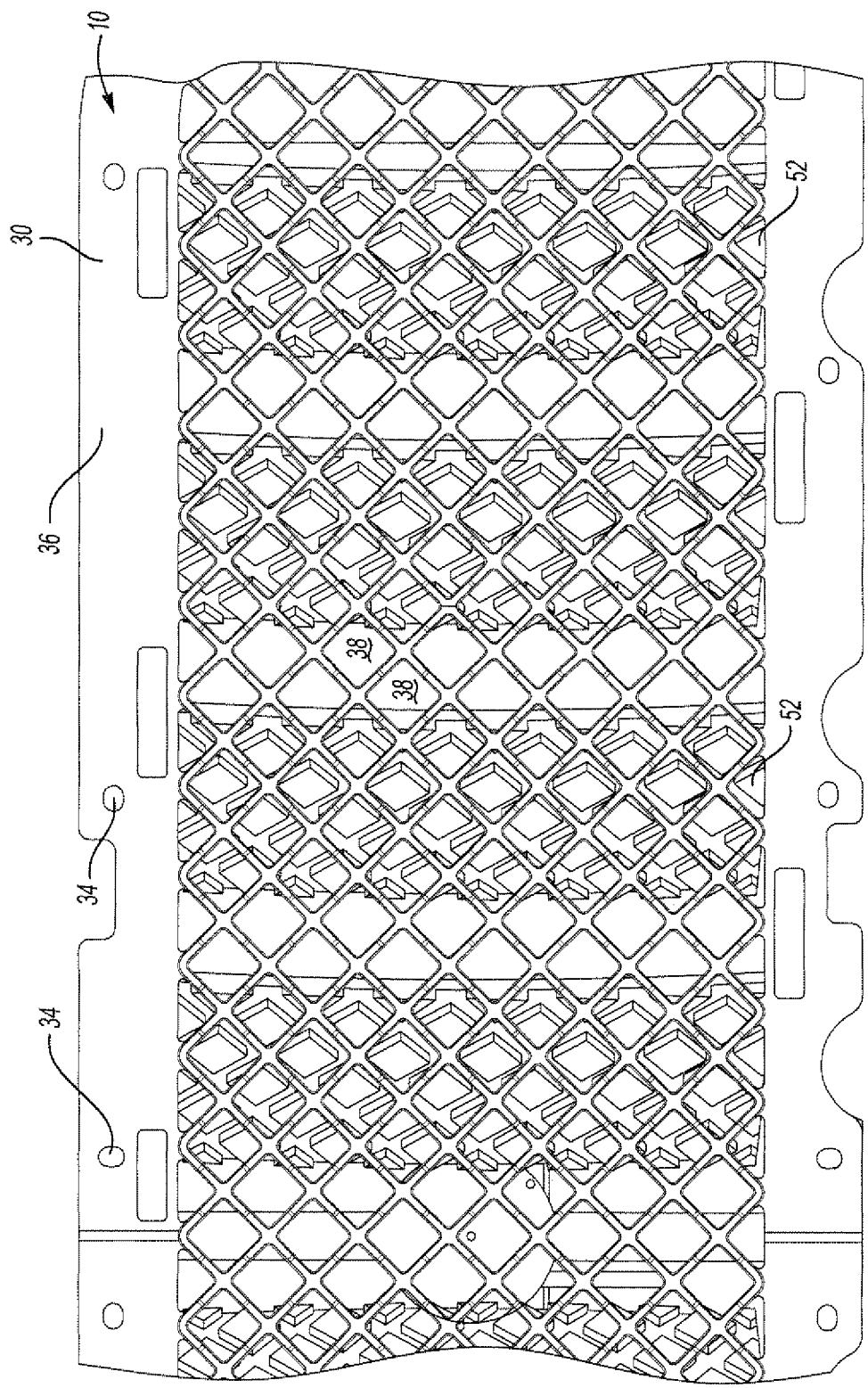
FIG. 3 is a front view of a section of a vehicle grill with the louvers in an open position in accordance with a preferred embodiment of the present invention.
Figure 4:
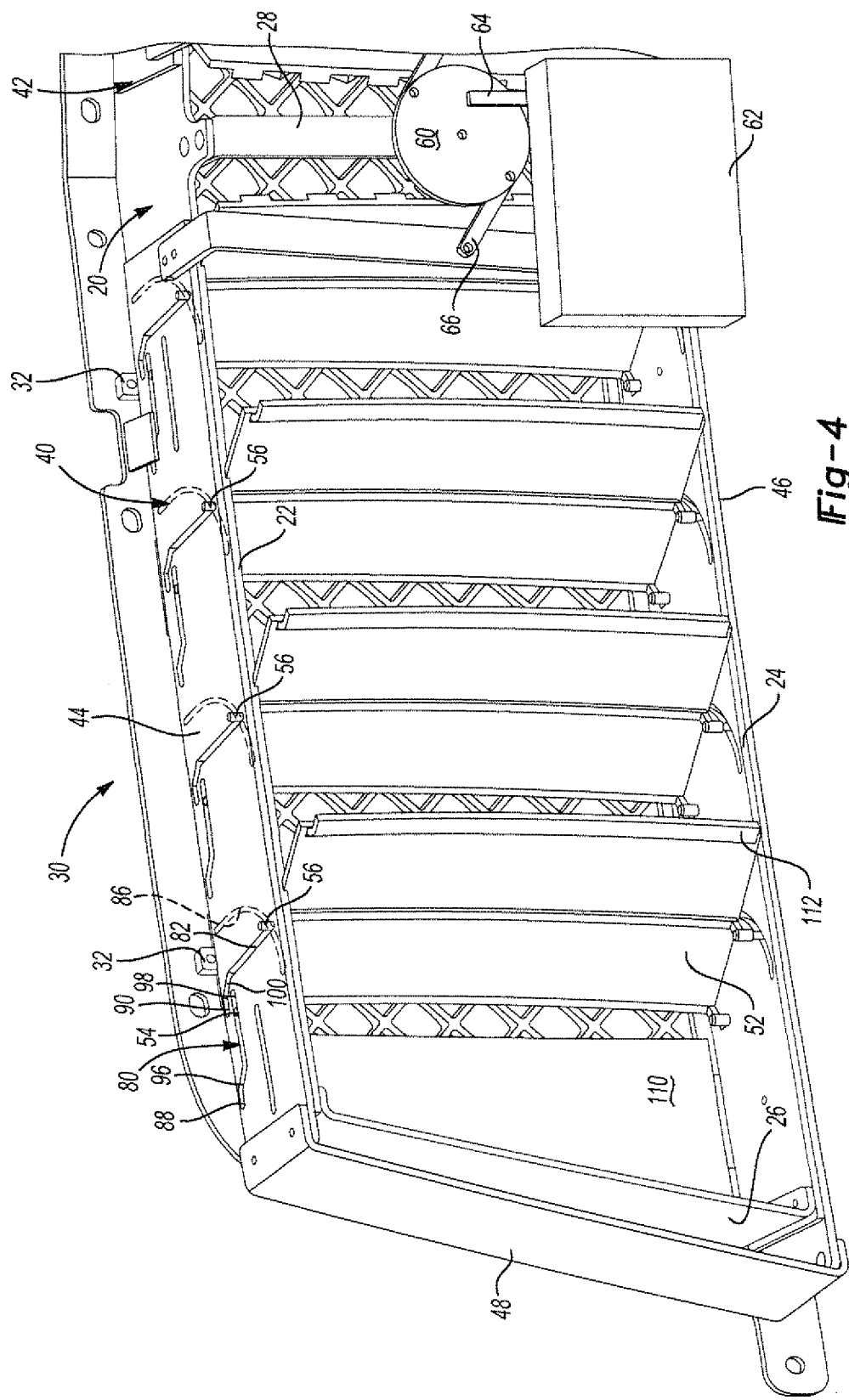
FIG. 4 is a rear perspective view of a section of a vehicle grill with the louvers in an open position in accordance with a preferred embodiment of the present invention.
Figure 5:
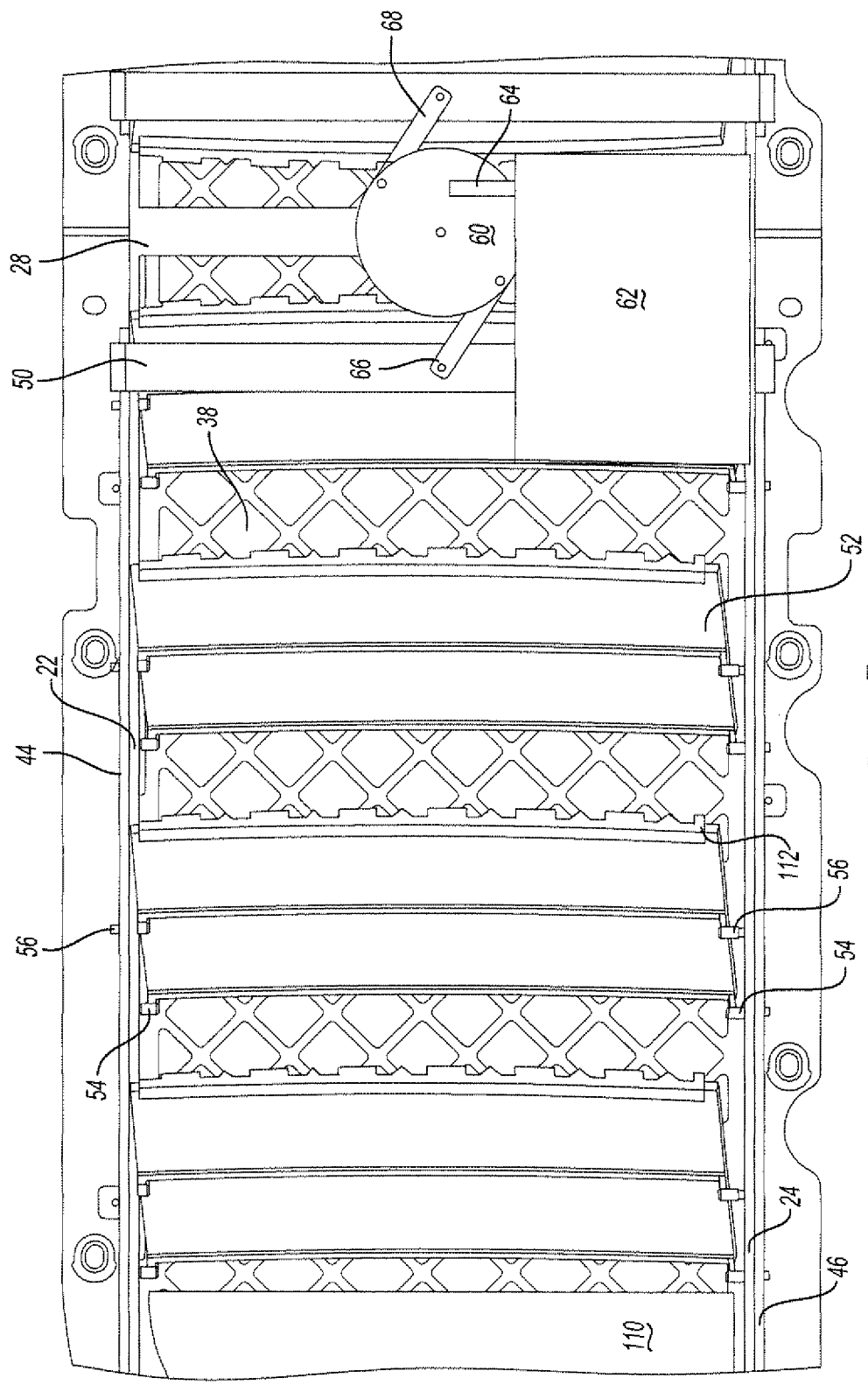
FIG. 5 is a rear view of a section of a vehicle grill with the louvers in an open position in accordance with a preferred embodiment of the present invention.
Figure 6:
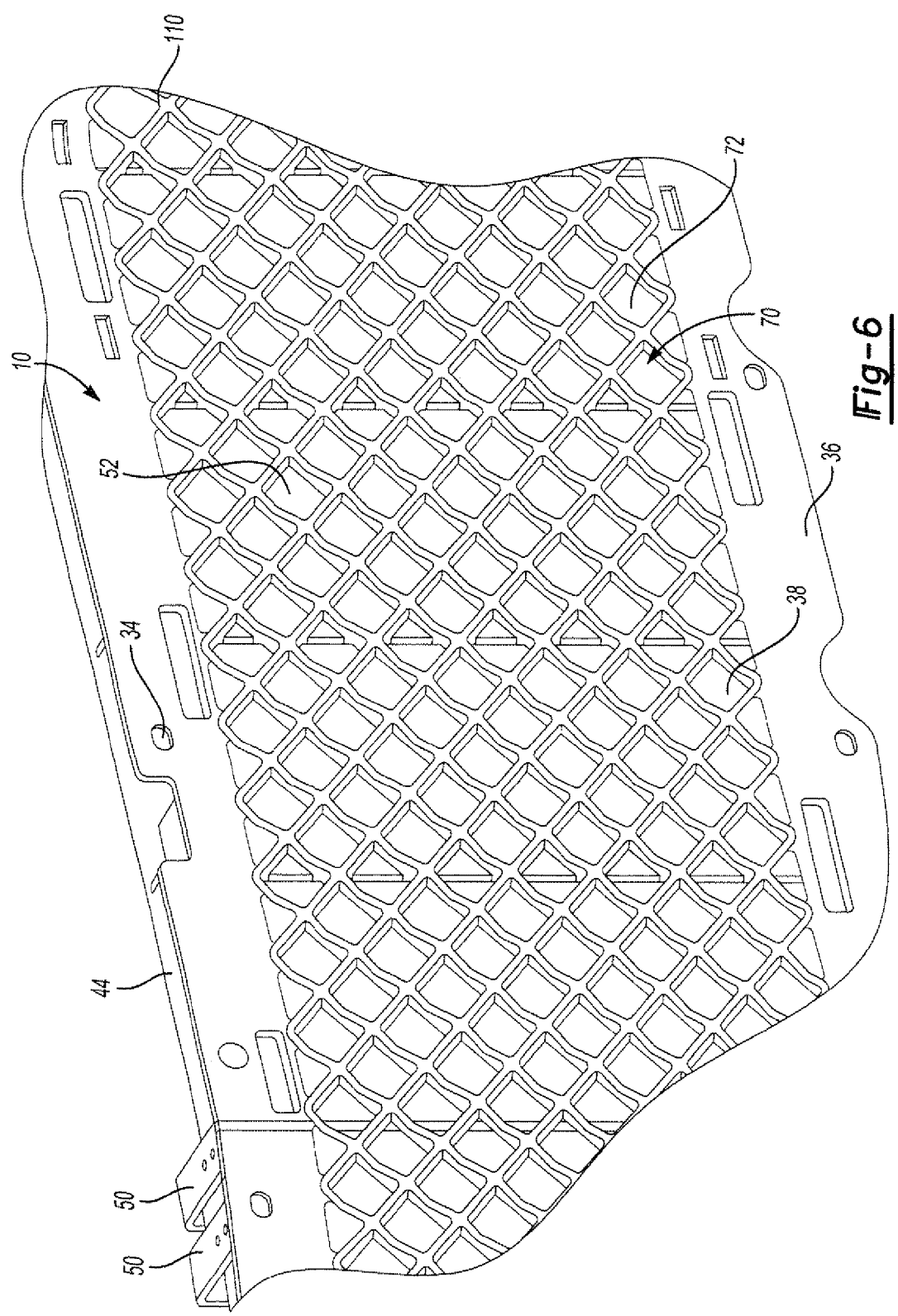
FIG. 6 is a front perspective view of a section of a vehicle grill with the louvers in a fully closed position in accordance with a preferred embodiment of the present invention.
Figure 7:
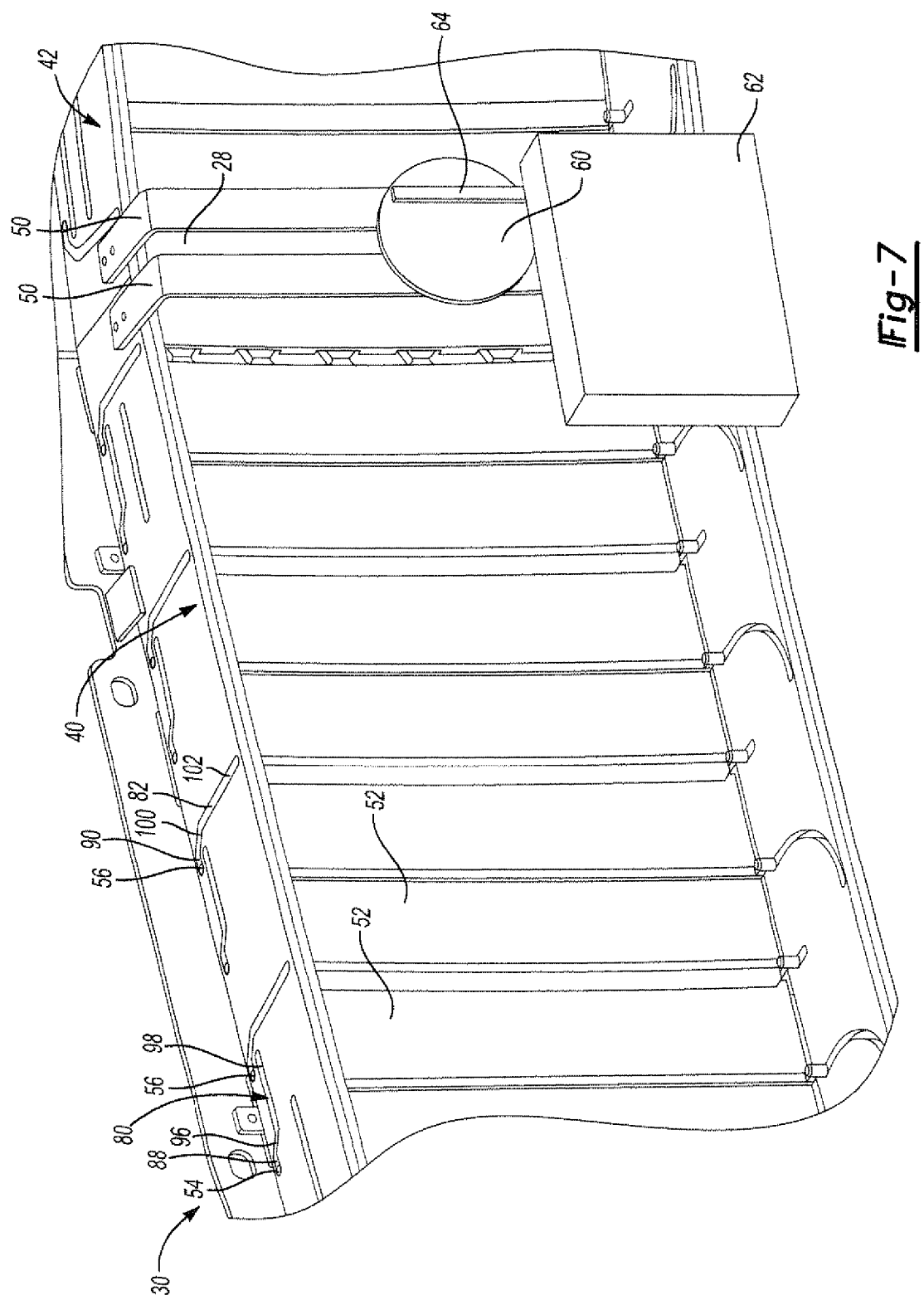
FIG. 7 is a rear perspective view of a section of a vehicle grill with the louvers in a fully closed position in accordance with a preferred embodiment of the present invention.
Figure 8:
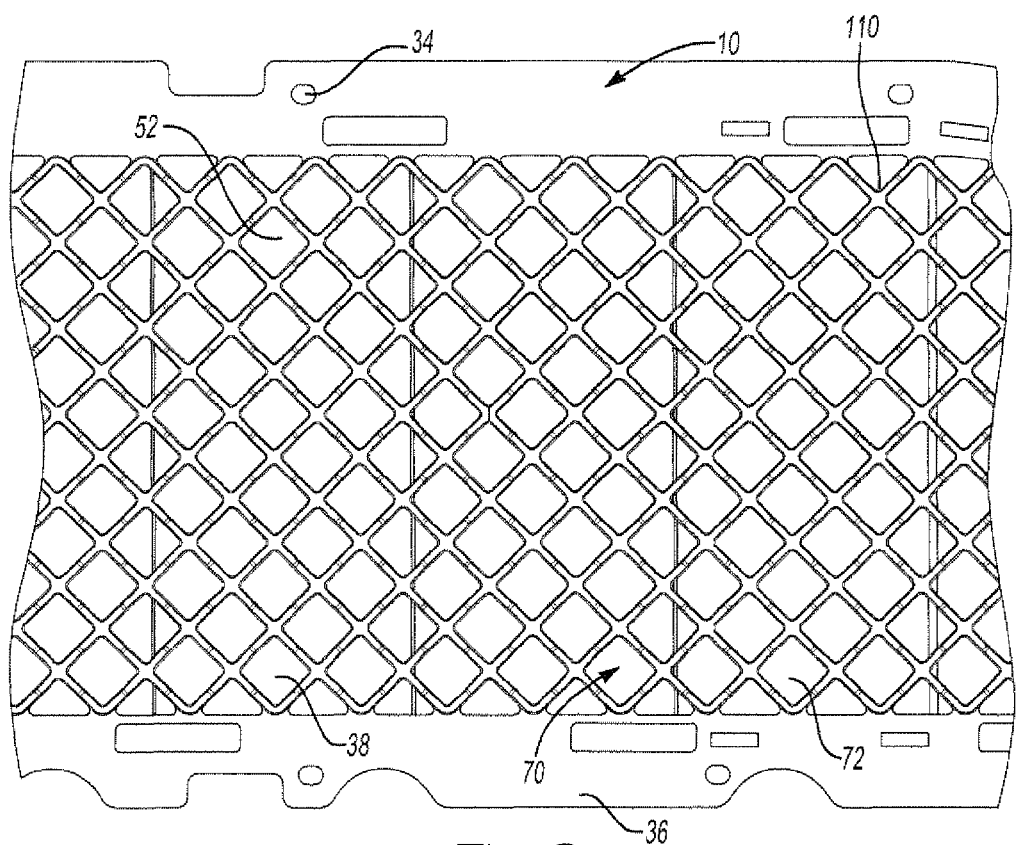
FIG. 8 is a front view of a section of a vehicle grill with louvers in a fully closed position in accordance with a preferred embodiment of the present invention.
Figure 9:
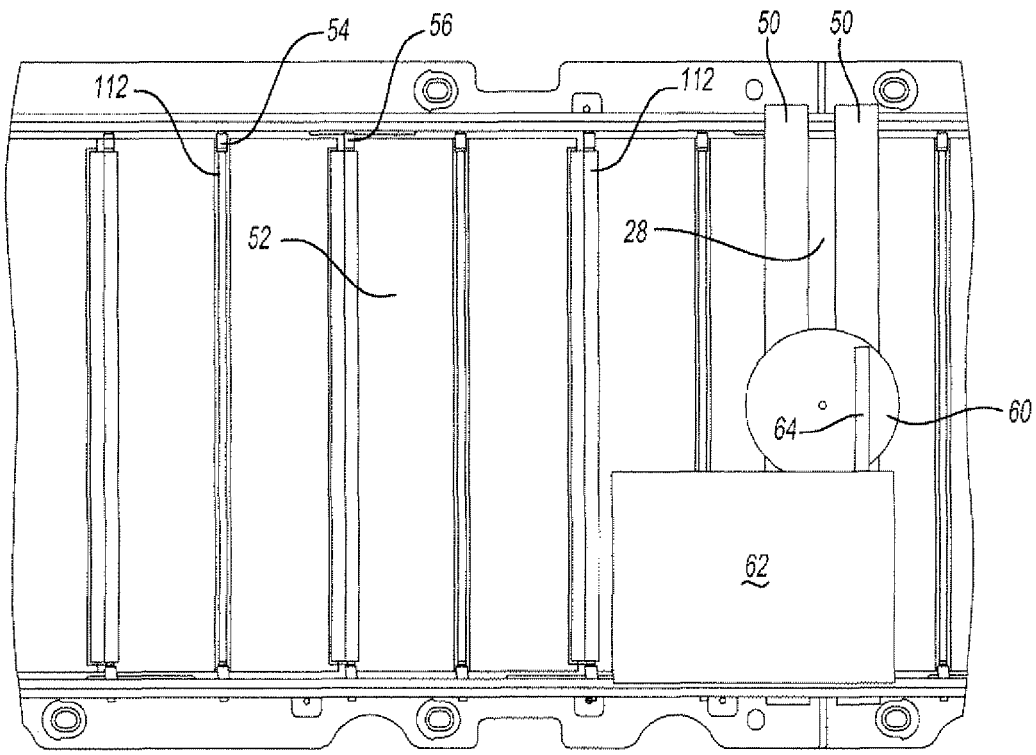
FIG. 9 is a rear view of a section of a vehicle grill with the louvers in a fully closed position in accordance with a preferred embodiment of the present invention.

Turning to FIGS. 2 though 9, which illustrates views of the vehicle grill 10 in accordance with a preferred embodiment of the present invention. FIGS. 2 and 3 show the grill 10 as viewed from the front direction, while FIGS. 4 and 5 illustrate the grill 10 as viewed from the back direction. In FIGS. 2 through 5, the grill 10 is illustrated in an open position to maximize air flow through the grill 10 and into the engine compartment 18, as discussed in more detail below. As can be seen, the grill 10 in these figures is not fully open, but is in a substantially open position. FIGS. 6 and 7 are perspective views illustrating the grill 10 in a closed position, as discussed in more detail below, with FIG. 6 showing the grill 10 from the front direction and FIG. 7 depicting the grill 10 from the back direction. FIG. 8 illustrates the vehicle grill 10 in a closed position as viewed from the front direction and FIG. 9 depicts the vehicle grill 10 in a closed position as viewed from the back direction.

With reference to the Figures, the grill 10 includes a base frame structure 20, having a top rail 22, a bottom rail 24, a pair of opposing side rails 26, and a middle rail 28. The base frame structure 20 is mounted to a mesh front structure 30 at a plurality of grill attachment locations 32. The mesh front structure 30 is mounted to the front portion 12 of the vehicle 14 at a plurality of mesh attachment locations 34. The mesh front structure 30 includes a border portion 36 and a plurality of mesh openings 38 within the mesh structure. The grill 10 also includes a pair of moveable picture frame sections 40, 42 that are located on opposite halves of the grill 10. The picture frame structures 40, 42 are disposed around or outwardly of the base frame structure 20. The picture frame sections 40, 42 are mirror images of each other and are identical in structure and function and thus the description of one applies equally to the description of the other.

The picture frame sections 40, 42 are moveable with respect to the base frame structure 20, as discussed in more detail below. Each picture frame section 40, 42 includes an upper rail 44, a lower rail 46, an opposing side strut 48, and a support rail 50. Each picture frame section 40, 42 is in communication with a plurality of louvers 52 at the upper rail 44 and the lower rail 46. The louvers 52 are pivotable between an open position (see e.g. FIGS. 2 through 5) and a closed position (see e.g. FIGS. 6 through 9) to expose or close off grill openings 120 between adjacent louvers 52. Each of the louvers 52 has a forward pivot 54 that engages the picture frame section 40 at both the upper rail 44 and the lower rail 46. The forward pivot 54 also engages the base frame structure 20 at the top rail 22 and the bottom rail 24. Each of the louvers 52 includes a rear pivot 56 that also engages the upper rail 44 and the lower rail 46 of the picture frame section 40 and the top rail 22 and the bottom rail 24 of the base frame structure 20.

As shown in FIG. 4, a rotatable cam 60 is rotatably secured to the middle rail 28 of the base frame structure 20. The rotatable cam 60 is in communication with a motor unit 62 by a drive arm 64. As shown, the drive arm 64 moves downward, as controlled by the motor unit 62, to drive the rotatable cam 60 in a clockwise direction and move the picture frame sections 40, 42 outwardly away from each other and the middle rail 28. As the picture frame sections 40, 42 move outwardly, the louvers 52 pivot to a closed position to close off the grill openings 120. Conversely, as the drive arm 64 moves upward, as controlled by the motor unit 62, to drive the rotatable cam 60 in a counter-clockwise direction, the picture frame sections 40, 42 are moved inwardly toward each other and the middle rail 28. The rotatable cam 60 has a first linkage arm 66 that connects with the support rail 50 of the picture frame section 40 to effectuate linear movement thereof. The rotatable cam 60 has a second linkage arm 68 that connects the support rail 50 of the picture frame 40 to effectuate linear movement thereof. It will be understood that the grill could be configured with louvers oriented horizontally. In that configuration, the picture frame portions would move upwardly and downwardly.

The louvers 52 are preferably constructed as vertical slats that have elongated rectangular sides. As can be seen when the louvers 52 are rotated into the open position, the elongated rectangular sides are oriented such that they are generally parallel to the direction of travel of the vehicle 14. In this position, the louvers 52 are spaced from one another such that a plurality of openings 120 are formed therebetween to allow air to flow therethrough and into communication with the engine compartment 18. When the louvers 52 are moved or assigned into the closed position, the slats are oriented such that the elongated rectangular sides substantially close off the openings and thereby minimize air flow through the grill and into the engine compartment. The louvers 52 are preferably formed of a plastic material, however, it will be understood that they can be formed of a metal or a variety of other suitable materials. Additionally, each of the louvers 52 preferably includes a flange portion 112 that serves to overlap and cover any opening between an adjacent louver 52.

Figure 10:
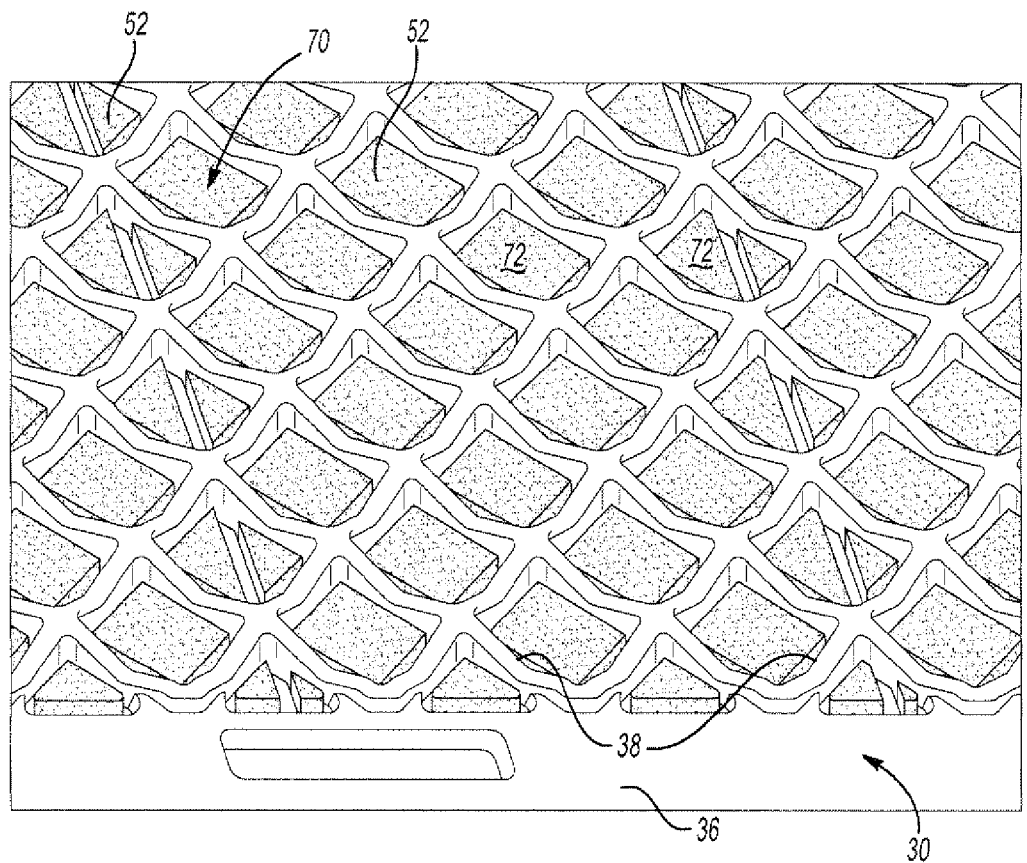
FIG. 10 is an enlarged view of the engagement of the louvers with the mesh openings for the mesh front structure in accordance with a preferred embodiment of the present invention.
Figure 13:
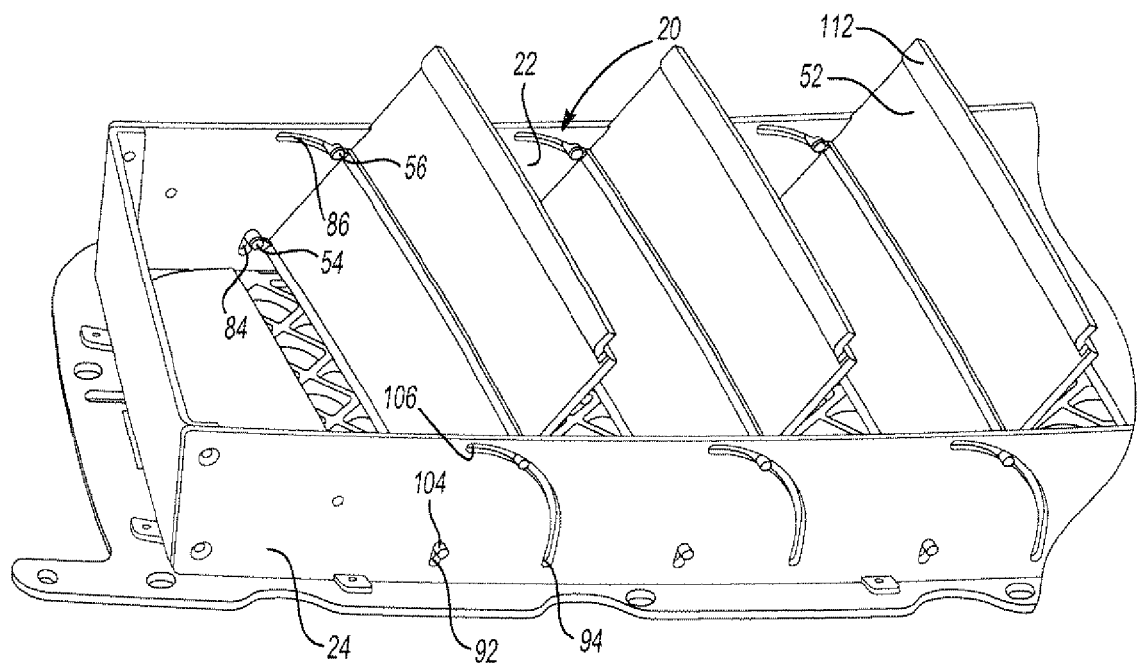
FIG. 13 is a partial perspective view of a vehicle grill with the louvers in a partially open position in accordance with a preferred embodiment of the present invention.

FIG. 10 illustrates an enlarged view of the grill 10 in a closed position. As shown, the louvers 52 have a front surface 70 that includes a plurality of raised portions 72 formed thereon. When the louvers 52 are in the closed position, each of the plurality of raised portions 72 nest within a respective one of the mesh openings 38 to form an integral structure such that air flow through each of the mesh openings 38 is blocked. Also, the nesting engagement of the plurality of raised portions 72 in the mesh openings 38 provides an appearance that the grill is an integral structure consisting of the louvers 52 and the mesh front surface 30. It will be understood that the mesh front surface 30 preferably serves a protective function, such as to prevent insertion of materials through the openings 120 between the louvers 52. The mesh front surface 30 is preferably plastic. However, it can also be formed of a variety of materials and can take on a variety of different configurations. It will also be appreciated that the edges of the louvers 52 can also contact the mesh front surface 30 when in the open position.

In accordance with one embodiment, in operation, the louvers 52 are in a closed position at start up of the vehicle 14. As the vehicle 14 begins to travel, the louvers 52 move to an open position for heat management purposes. Thereafter, as the vehicle increases to a certain predetermined speed, the louvers 52 move to a closed position to reduce the coefficient of drag and provide improved aerodynamics. It will be understood that the louvers 52 can be controlled to move at various different speeds and to different displacements depending upon the vehicle. For example, they can be partially closed under certain circumstances to allow limited airflow. Alternatively, the louvers 52 can be controlled to move under other conditions. The exact conditions under which the louvers 52 move between the open and closed position is not critical and is not intended to be limiting. Moreover, under some conditions, the louvers 52 can also be partially open or partially closed to restrict air flow, but not totally block it off. The movement and timing of the louvers 52 is effectuated by a controller (not shown) that is in communication with the motor unit 62.

Figure 11:
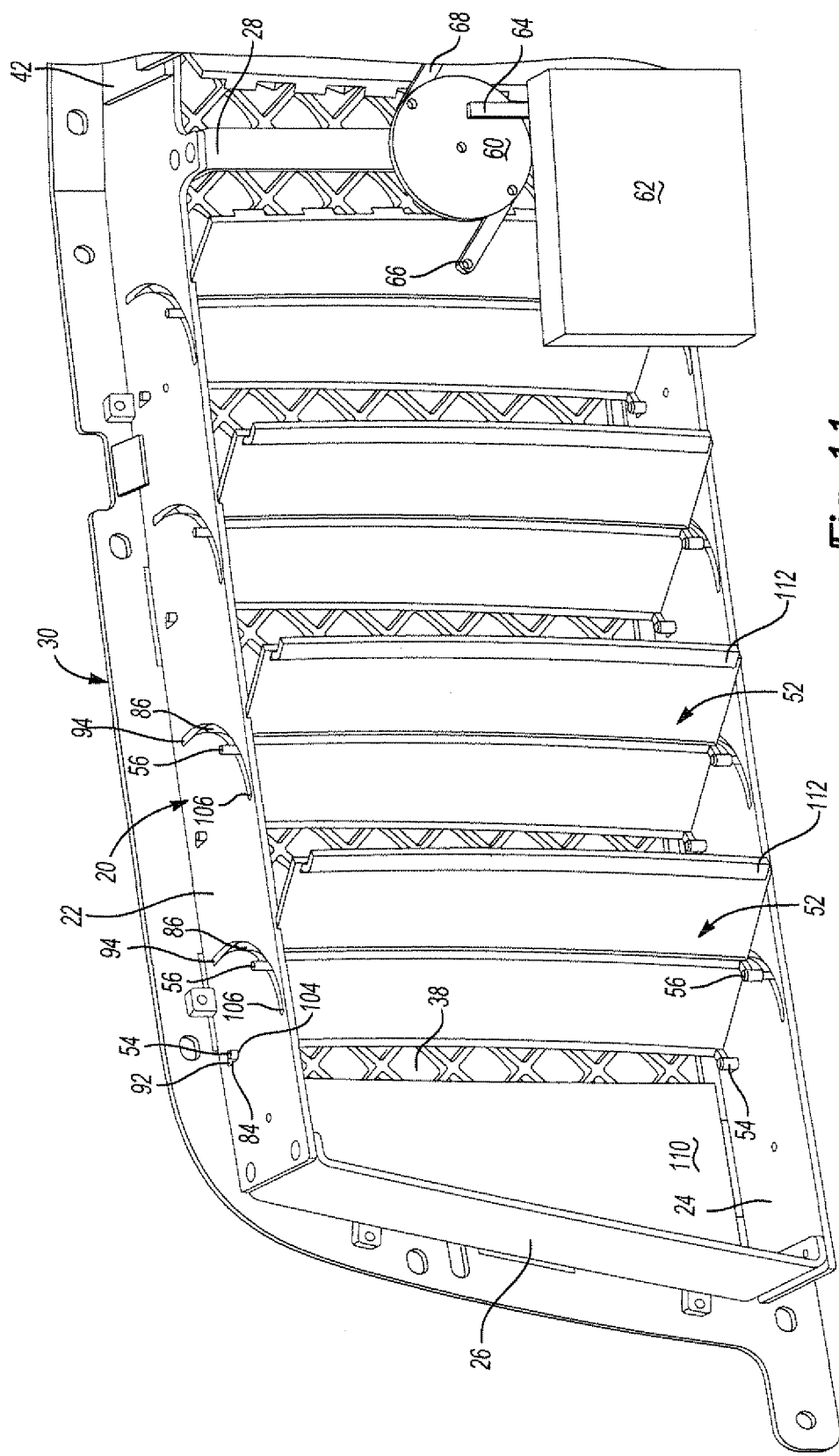
FIG. 11 illustrates a portion of a vehicle grill in accordance with a preferred embodiment of the present invention.
Figure 12:
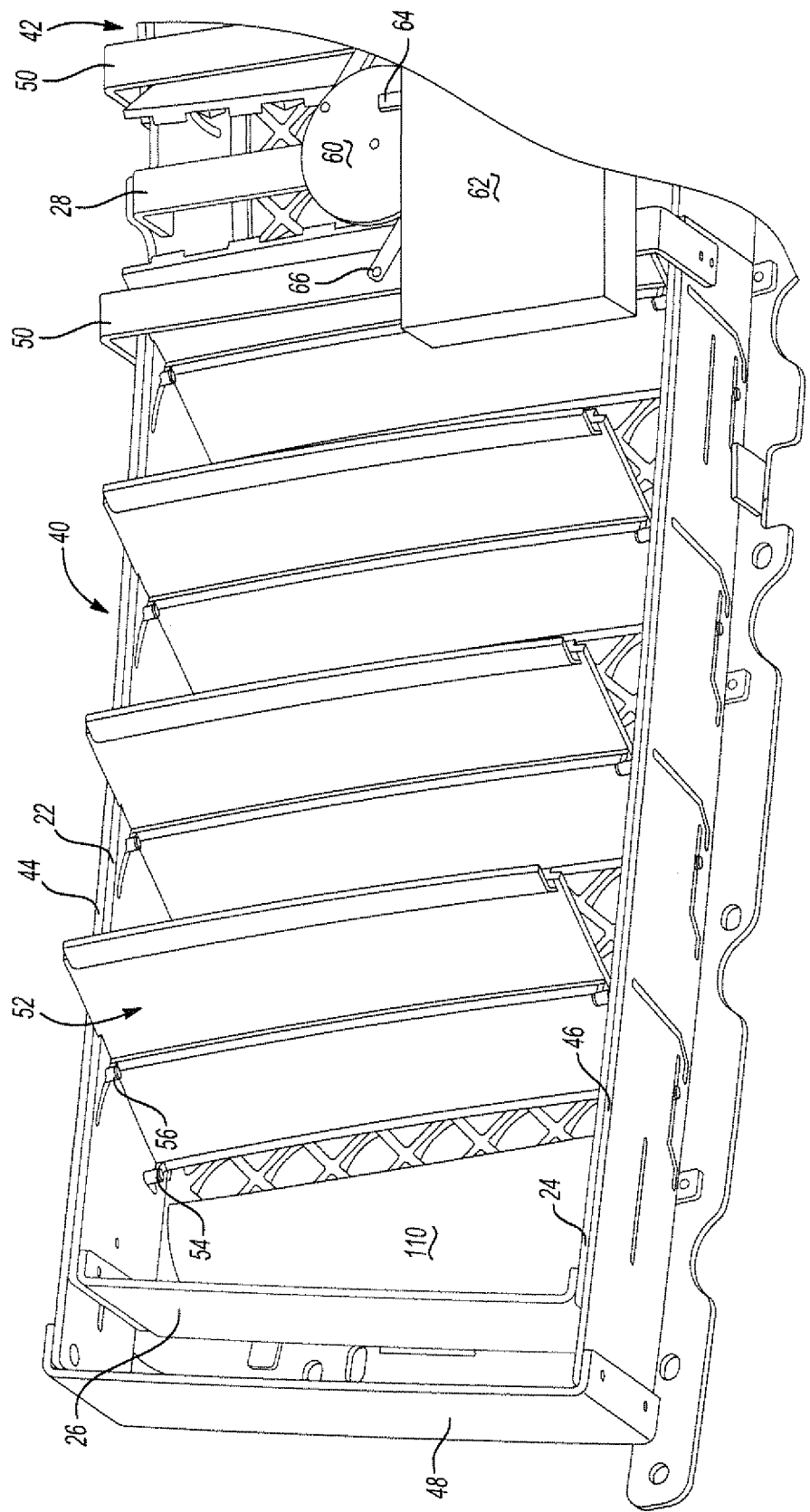
FIG. 12 is another perspective view of a vehicle grill with the louvers in a partially open position in accordance with a preferred embodiment of the present invention.

Referring now to FIGS. 11 and 12, which better illustrate the path of travel of the louvers 52 as they are moved between the open and the closed positions. As shown in FIG. 11, the forward pivot 54 of each louver 52 travels within a respective generally horizontal slot 80 of the picture frame section 40. The rear pivot 56 of each louver 52 travels within a respective generally vertical slot 82 of the picture frame section 40. As shown in FIG. 12, the forward portion 54 of each louver 52 travels within a respective notch 84 of the base frame structure 20. The rear pivot 56 of each louver 52 travels within a generally arcuate notch 86 of the base frame structure 20. Thus, the slots 80, 82 have different configurations than the notches 84, 86. The slots 80, 82 are formed in both the upper rail 44 and the lower rail 46 of the picture frame sections 40, 42 and have the same structure and configuration. Similarly, the notches 84, 86 are formed in both the top rail 22 and the bottom rail 24 of the base frame structure 20.

As shown in FIG. 7, when the louvers 52 are in the fully closed position, the forward pivot 54 resides in a forward portion 88 of the generally horizontal slot 80. In this configuration, the raised portions 72 engage the mesh openings 38 of the mesh front structure 30. As also shown, the rear pivot 56 resides in a forward section 90 of the generally vertical slot 82. In this configuration, the forward pivot 54 rests in the forward edge 92 of the notch 84 and the outward edge 94 of the generally arcuate notch 86, as discussed in more detail below. As dictated by the motor unit 62, the rotatable cam 60 rotates to push the picture frame sections 40, 42 outwardly by pushing the support rails 50 away from each other through the first and second linkage arms 66, 68. As this happens, the forward pivot 54 moves along the forward section 88 of the horizontal slot 80 until it reaches the ramp section 96. When the forward pivot 54 reaches the forward ramp section 96, the louvers 52 move away from engagement with the mesh front structure 30. After the forward pivot 54 exits the forward ramp section 96, it travels along the rear portion 98 of the generally horizontal slot 80. When it reaches the end of the rear portion 90, the louvers 52 are in the fully open position.

As the forward pivot 54 moves as described above, the rear pivot 56 moves differently to allow the louvers 52 to pivot outwardly. Specifically, when the louvers 52 are in the fully closed position, the rear pivot 56 resides in a forward section 90 of the generally vertical slot 82. As the forward pivot 54 engages the forward ramp section 96 of the generally horizontal slot 80, the rear pivot 56 engages the rear ramp section 100 of the generally vertical slot 82, which begins pivoting the louvers 52 to increase the openings therebetween. After the rear pivot 56 exits the rear ramp section 100, it passes though the rear portion 102 of the generally vertical slot 82 to fully open the louvers 52. The forward pivot 54 and the rear pivot 56 move through their respective range of travel while the picture frame sections 40, 42 move outwardly. It will be understood that the louvers 52 travel in reverse to the path just described as the louvers 52 are moved from the open position to the closed position.

Because the base frame structure 20 is stationary, the forward and rear pivots 54, 56 travel along different paths within the top rail 22 and the bottom rail 24 of the frame structure 20. Specifically, with reference to FIG. 12, when the louvers 52 are in the fully closed position, the forward pivot 54 resides in the forward edge 92 of the notch 84. In this configuration, the raised portions 72 engage the mesh openings 38 of the mesh front structure 30. As the picture frame sections 40, 42 begin to move, the forward pivot 54 travels outwardly in notch 84 to the rear edge 104, such that the louvers 52 are moved away from engagement with the mesh openings 38.

As the forward pivot 54 moves within the base frame structure 20 as described above, the rear pivot 56 moves differently to allow the louvers 52 to pivot outwardly. Specifically, when the louvers 52 are in the fully closed position, the rear pivot 56 resides in the outward edge 94 of the generally arcuate notch 86. As the picture frame section 40 moves, the rear pivot 56 begins traveling rearwardly (away from the mesh front structure 30) within the generally arcuate notch 86. The rear pivot 56 travels along the full length of the generally arcuate notch 86 until it reaches the rearward edge 106 when the forward pivot 72 is located in the rear edge 104 and the rear pivot 56 is located in the rearward edge 106 of the generally arcuate notch 86, the louvers 52 are in their fully open position.

As shown in FIG. 11, the grill 10 also includes a pair of end louvers 110 that do not move as the motor unit 62 actuates the rotatable cam 60 to move the picture frame sections 40, 42. Thus, the pair of end louvers 110 are permanently in the closed position to prevent air from passing through the associated mesh openings 38 at all times.

The description of movement of the louvers 52 from the fully closed position to the fully open position has been described above as well as the mechanism for effectuating such movement. It will be understood that the movement of the lovers 52 from the fully open position to the fully closed position as well as the mechanism for effectuating such movement is the same as described above only in reverse. For example, the motor unit 52 is actuated to drive the rotatable cam 52 in the opposite direction by pulling the drive arm 64 downwardly. When the rotatable cam 52 rotates in a counter-clockwise direction, the support rails 50 of the picture frame sections 40, 42 are moved inwardly toward each other until they reach the position as shown in FIG. 7 where the lovers 52 are engaging the mesh openings 38 and are in a fully closed position. The forward pivot 54 and the rear pivot 56 move within the respective slots 80, 82 and notches 86, 88 in the opposite direction described above to move the louvers 52 from the fully open position to the fully closed position. It will be understood that the motor unit 62 may be programmed to partially open or partially closed the louvers 52 such that they are moved to a position between the fully open or fully closed position as desired.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A grill for attachment to a front portion of a vehicle, comprising:
    a base frame structure;
    a mesh front structure secured to said base frame structure, the mesh front structure having a plurality of openings;
    at least one picture frame structure that is moveable with respect to said base frame structure;
    a plurality of louvers that are in communication with and moveable with respect to said base frame structure and said at least one picture frame structure, each of said plurality of louvers having a plurality of individual raised structures; and
    a motor unit in communication with said at least one picture frame structure to effectuate movement thereof such that as said at least one picture frame structure moves, said plurality of louvers move between an open position and a closed position, whereby openings between adjacent ones of said plurality of louvers are exposed or shut off;
    whereby in said closed position, said plurality of individual raised structures nest within a respective one of said plurality of openings.

2. The grill of claim 1, wherein said at least one picture frame structure is disposed around said base frame structure and said at least one picture frame is slideable inwardly and outwardly with respect to said base frame structure.

3. The grill of claim 2, wherein said motor unit is in communication with a rotatable cam to effectuate movement of said at least one picture frame structure.

4. The grill of claim 3, wherein when said rotatable cam is rotated in a clockwise direction, said at least one picture frame structure moves outwardly to position said plurality of louvers in said open position.

5. The grill of claim 3, wherein when said rotatable cam is rotated in a counter-clockwise direction, said at least one picture frame structure moves inwardly to position said plurality of louvers in said closed position.

6. The grill of claim 1, wherein each of said louvers includes a flange portion that overlaps an adjacent one of said plurality of louvers to shut off a respective one of said openings when said louver is in said closed position.

7. A grill for attachment to a vehicle and controlling air flow from a vehicle exterior to an engine compartment, comprising:
    a mesh front structure including a border secured to the vehicle and a plurality of mesh openings that allow air to flow through said mesh front structure;
    a plurality of louvers disposed behind said mesh front structure and being spaced apart to form a plurality of grill openings between adjacent ones of said plurality of louvers, said plurality of louvers being moveable between an open position where air can flow through said plurality of grill openings and a closed position where said plurality of louvers close off said plurality of grill openings, said plurality of louvers having a plurality of protrusions disposed on a surface thereof;
    at least one picture frame structure that is moveable with respect to said mesh front structure; and
    a motor unit in communication with said at least one picture frame structure to effectuate movement thereof, such that as said at least one picture frame structure moves, said plurality of louvers move between said open position and said closed position and in said closed position, said plurality of protrusions nest within said plurality of mesh openings.

8. The grill of claim 7, further comprising:
    a base frame structure that is secured to said mesh front structure.

9. The grill of claim 7, wherein said base frame structure is disposed within said at least one picture frame structure such that said at least one picture frame structure moves linearly with respect to said base frame structure.

10. The grill of claim 9, wherein said plurality of louvers are in pivotal communication with each of said at least one picture frame structure and said base frame structure.

11. The grill of claim 7, wherein said plurality of louvers are in pivotal communication with said at least one picture frame structure.

12. The grill of claim 7, wherein, wherein said motor unit is in communication with a rotatable cam to effectuate movement of said at least one picture frame structure.

13. The grill of claim 12, wherein when said rotatable cam is rotated in a counter-clockwise direction, said at least one picture frame structure moves inwardly to position said plurality of louvers in said closed position.

14. The grill of claim 12, wherein when said rotatable cam is rotated in a clockwise direction, said at least one picture frame structure moves outwardly to position said plurality of louvers in said open position.

15. A grill for attachment to a vehicle that allows air to flow through the grill when in an open position, comprising:
    a base frame structure secured to the vehicle;
    a protective structure secured to said base frame structure, said protective structure having a plurality of openings formed therein;
    at least one picture frame structure that is movable with respect to said base frame structure;
    a plurality of louvers that are movable with respect to said base frame structure and said at least one picture frame structure, said plurality of louvers having a plurality of raised structures disposed thereon; and
    a motor unit in communication with said at least one picture frame structure to effectuate movement thereof such that as said at least one picture frame structure slides, said plurality of louvers move between an open position and a closed position, thus exposing or shutting off openings between adjacent ones of said plurality of louvers;
    whereby in said closed position, said plurality of raised structures nest within said plurality of openings in said protective structure.

16. The grill of claim 15, wherein said protective structure is a mesh structure that is attached to an outer surface of said base frame structure.

17. The grill of claim 15, wherein said plurality of louvers are in pivoted communication with each of said base frame structure and said at least one picture frame structure.

* * * * *